(12) United States Patent  
Wang (10) Patent No.: US 11,789,882 B2  
(45) Date of Patent: Oct. 17, 2023

(54) SENSOR CONFIGURATION METHOD, APPARATUS, COMPUTER EQUIPMENT AND STORAGE MEDIUM

(71) Applicant: Black Sesame Technologies Inc., San Jose, CA (US)

(72) Inventor: Zixiang Wang, Chengdu (CN)

(73) Assignee: Black Sesame Technologies Inc., San Jose, CA (US)

( * ) Notice: Subject to any disclaimer, the term of this patent is extended or adjusted under 35 U.S.C. 154(b) by 142 days.

(21) Appl. No.: 17/544,585

(22) Filed: Dec. 7, 2021

(65) Prior Publication Data

US 2022/0345526 A1    Oct. 27, 2022

(30) Foreign Application Priority Data

Apr. 25, 2021    (CN) .......................... 202110449302.7

(51) Int. Cl.
*G06F 13/38*    (2006.01)
*G06F 13/10*    (2006.01)

(52) U.S. Cl.
CPC .......... *G06F 13/387* (2013.01); *G06F 13/102* (2013.01)

(58) Field of Classification Search
None
See application file for complete search history.

(56) References Cited

U.S. PATENT DOCUMENTS

2016/0165097 A1* 6/2016 Takenouchi ........... H04N 1/603
358/1.9

FOREIGN PATENT DOCUMENTS

| CN | 104714810 A | 6/2015 |
| CN | 106776409 A | 5/2017 |
| CN | 108375390 A | 8/2018 |
| CN | 108429786 A | 8/2018 |
| CN | 110569206 A | 12/2019 |
| CN | 110688162 A | 1/2020 |
| CN | 112506571 A | 3/2021 |
| WO | 2021070849 A1 | 4/2021 |

* cited by examiner

*Primary Examiner* — Scott C Sun
(74) *Attorney, Agent, or Firm* — Timothy Wang; Ni, Wang & Massand, PLLC (57) ABSTRACT

A sensor configuration method, an apparatus, computer equipment and a storage medium are disclosed. The method includes acquiring connection configuration information generated based on user input, querying for a target sensor driver matched with a target sensor represented by the sensor identifier in a device driver set, calling a target communication port driver matched with the target communication port represented by the communication port identifier and establishing communications with the target sensor by the target sensor driver and the target communication port driver. The connection configuration information includes a sensor identifier and a communication port identifier. The device driver set is pre-stored with a number of sensor drivers corresponding to a number of sensors.

11 Claims, 10 Drawing Sheets

SENSOR CONFIGURATION METHOD, APPARATUS, COMPUTER EQUIPMENT AND STORAGE MEDIUM

CROSS-REFERENCE TO RELATED APPLICATIONS

The disclosure claims priority to Chinese Patent Application No. 202110449302.7, filed on Apr. 25, 2021, the entire contents of which are incorporated herein by reference.

TECHNICAL FIELD

The present application relates to the field of sensor technologies, and more specifically, to a sensor configuration method, an apparatus, a computer device, and a storage medium.

BACKGROUND

Sensors are widely used in various fields, among those fields, there is a need to use a variety of sensors in a single device.

For example, sensors are indispensable and important components of smart vehicles. In the entire vehicle system, they are responsible for information collection. With the rapid development of automobile intelligence, the number of sensors on an automobile is increased, and the sensor data to be processed is also more complicated. In an L2-level automatic driving technology, namely, an Advanced Driving Assistance System (ADAS), sensors such as monocular cameras, ultrasonic radars, laser radars, and the like may be installed on an automobile to sense an obstacle around the automobile body. The type of the obstacle may be distinguished by an algorithm such as sensor fusion. The position and the attitude of the automobile are accurately calculated by installing a Global Navigation Satellite System (GNSS) sensor, an Inertial Measurement Unit (IMU) sensor and the like on the automobile, so that high-precision positioning is realized. The measurement of the sensors is influenced by complicated and variable road traffic environments and dark environments such as illumination, rain, fog and tunnels. The sensors can be multiplied along with the development of the automatic driving technology to ensure the validity of data. More and more sensors and more complex sensors also pose challenges to software frameworks, and in terms of numerous and complex sensors, compatibility, expansibility and the like are problems to be solved by current software design.

In the stages of development, testing and application of the sensors, there may be a need to change the connection configuration between the main control chip and the sensor. For example, changes regarding the type and model of the sensor connected to the main control chip, or changes regarding the communication port connected between the main control chip and the sensors. In the prior art, when the type and model of a connected sensor need to be changed or a communication port connected with the sensor needs to be changed, the user needs to manually modify software to realize the port connection between a sensor port on a software level and a main control chip and the sensor drive configuration, resulting a low efficiency of configuring the connection between the main control chip and the sensors.

SUMMARY

In view of the foregoing, it is necessary to provide a sensor configuration method, an apparatus, a computer device, and a storage medium, which can improve efficiency of configuring a connection between a main control chip and the sensors.

In one aspect, a sensor configuration method is provided. The method includes acquiring connection configuration information generated based on user input, querying for a target sensor driver matched with a target sensor represented by the sensor identifier in a device driver set, calling a target communication port driver matched with the target communication port represented by the communication port identifier and establishing communications with the target sensor by the target sensor driver and the target communication port driver. The connection configuration information includes a sensor identifier and a communication port identifier. The device driver set is pre-stored with a number of sensor drivers corresponding to a number of sensors.

In one embodiment, prior to the step of acquiring the connection configuration information generated based on the user input, the method further includes the steps of generating the sensor identifier of each sensor and a sensor drive matched with the sensor respectively for each sensor in the plurality of sensors and storing the sensor identifier of each sensor in association with corresponding sensor drive into the device drive set.

In one embodiment, the sensor identifier includes information of a sensor type and a sensor serial number. The step of querying for the target sensor driver matched with the target sensor represented by the sensor identifier in the device driver set includes analyzing the sensor identifier to obtain the type and the sensor serial number; querying the device driver set to obtain a device driver subset matched with the sensor type from the device driver set; and querying the device driver subset to acquire the target sensor driver matched with the sensor serial number from the device driver subset.

In one embodiment, the step of acquiring the connection configuration information generated based on user input includes receiving a sensor registration request generated based on the user input from a current user account; wherein the sensor registration request contains the sensor type to be registered, querying and acquiring the sensor identifier information matched with the type of the sensor to be registered and corresponding to the sensor having stored with the sensor drive in the device driver set based on the type of the sensor to be registered, returning the queried sensor identifier information to the current user account so that the current user account provides the user with options of the sensor identifier information, and receiving the connection configuration information generated based on user input from the current user account. The connection configuration information comprises a certain sensor identifier selected from the options of the sensor identifier information and a communication port identification input by a user.

The connection configuration information further includes a sensor type. After the step of acquiring the connection configuration information generated based on user input, the method further includes jumping to and executing the step of querying for the target sensor driver matched with the target sensor represented by the sensor identifier in the device driver set when no communications with the target sensor are established; and associating the current user account and the sensor type to be registered to the target sensor so that the target sensor collects and transmits data corresponding to the sensor type to be registered to the current user account after the communications with the target sensor are established by using the target sensor driver and the target communication port driver.

After obtaining the connection configuration information generated based on the user input, the method further includes directly associating the current user account and the sensor type to be registered to the target sensor after the connection configuration information generated based on user input is acquired when communications have been established with the target sensor so that the target sensor collects and transmits data corresponding to the sensor type to be registered to the current user account.

In one embodiment, the sensor configuration method further includes receiving a sensor logout request generated based on user input from a current user account; wherein the sensor logout request contains a sensor type to be logout; querying and acquiring the information of target sensors registered by the current user account and matched with the type of the sensor to be logged out in a sensor registration list based on the type of the sensor to be logged out; the sensor registration list is configured for storing information of the target sensors corresponding to different sensor types registered by different user accounts; logging off the current user account from the queried target sensors, so that the target sensor stops collecting and transmitting data corresponding to the type of the sensor to be logged off to the current user account.

In one embodiment, the step of logging off the current user account from the queried target sensors, so that the target sensor stops collecting and transmitting data corresponding to the type of the sensor to be logged off to the current user account includes disassociating the current user account and the sensor type to be logged out from the target sensor when other user accounts or other sensor types are associated to the target sensor, so that the target sensor stops collecting and transmitting data corresponding to the sensor type to be logged out to the current user account; and canceling the communications established with the target sensor, and disassociating the current user account and the sensor type to be logged out from the target sensor when no other user account exists or other sensor types are associated to the target sensor, so that the target sensor stops collecting and transmitting data corresponding to the sensor type to be logged out to the current user account.

In another aspect, a sensor configuration apparatus is provided. The apparatus includes a connection configuration information acquisition module configured to, acquire connection configuration information generated based on user input; wherein the connection configuration information comprises a sensor identifier and a communication port identifier; a target driver query module configured to, query for a target sensor driver matched with a target sensor represented by the sensor identifier in a device driver set; the device driver set is pre-stored with a plurality of sensor drivers corresponding to a plurality of sensors; a target protocol query module configured to, calling a target communication port driver matched with the target communication port represented by the communication port identifier; and a connection establishing module configured to, establish communications with the target sensor by the target sensor driver and the target communication port driver.

In another aspect, a computer device including a memory storing a computer program and a processor is provided. The processor implements the steps of the sensor configuration method when executing the computer program. The sensor configuration method includes acquiring connection configuration information generated based on user input, querying for a target sensor driver matched with a target sensor represented by the sensor identifier in a device driver set, calling a target communication port driver matched with the target communication port represented by the communication port identifier and establishing communications with the target sensor by the target sensor driver and the target communication port driver. The connection configuration information includes a sensor identifier and a communication port identifier. The device driver set is pre-stored with a number of sensor drivers corresponding to a number of sensors.

In another aspect, a computer-readable storage medium is provided. Computer programs are stored on the computer-readable storage medium. When the computer programs are executed by a processor, the steps of the sensor configuration method is implemented. The sensor configuration method includes acquiring connection configuration information generated based on user input, querying for a target sensor driver matched with a target sensor represented by the sensor identifier in a device driver set, calling a target communication port driver matched with the target communication port represented by the communication port identifier and establishing communications with the target sensor by the target sensor driver and the target communication port driver. The connection configuration information includes a sensor identifier and a communication port identifier. The device driver set is pre-stored with a number of sensor drivers corresponding to a number of sensors.

According to the sensor configuration method, the sensor configuration device, the computer device and the storage medium, a number of sensor drivers corresponding to a number of sensors are pre-stored in a device driver set, and communication port drivers which are matched with different communication port identifiers and support communication protocols of different communication port types are pre-stored, so that when a main control chip needs to establish communications with the sensors, a target sensor driver matched with a target sensor represented by the sensor identifier and a target communication port driver matched with a communication port represented by the communication port identifier are acquired according to connection configuration information which is generated by user input and contains the sensor identifier and the communication port identifier, and the connection between the main control chip and the target sensor is established by utilizing the inquired target sensor driver and the inquired target communication port driver. Therefore, a user can flexibly change the connection configuration between various sensors and the main control chip according to the requirement, the main control chip can automatically call corresponding driving programs according to the input of the user to realize the communication connection between the target sensor and the main control chip, the user does not need to manually modify the software program of the main control chip, and the efficiency of the connection between the configuration main control chip and the sensors is effectively improved.

DETAILED DESCRIPTION OF THE EMBODIMENTS

In order to make the objects, technical solutions and advantages of the present disclosure more clearly understood, the present disclosure is further described in detail below with reference to the accompanying drawings and embodiments. It should be understood that the specific embodiments described herein are merely illustrative of and not restrictive on the disclosure.

Figure 1:
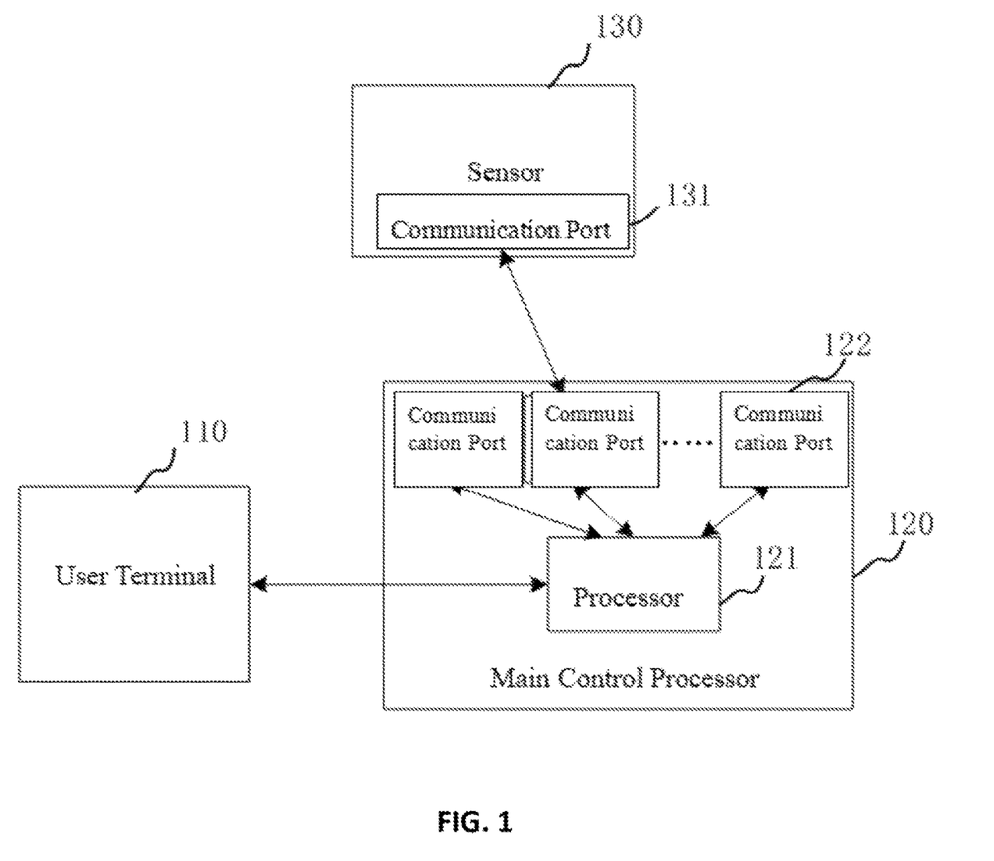
FIG. 1 is an application environment diagram of a sensor configuration method in an embodiment.

The sensor configuration method provided by the disclosure can be applied to the application environment shown in FIG. 1. Wherein, the user terminal 110 is connected to the main control chip 120 in a communication manner. The user terminal 110 may be, but is not limited to, various personal computers, notebooks, smart phones, tablet computers, personnel devices, and the like. The main control chip 120 may be, for example, a System On Chip (SOC). The main control chip 120 includes a processor 121 and a number of communication ports 122 of a given type connected to the processor 121. A user may physically connect each sensor 130 to the communication port 122 of a designated main control chip 120 through the communication port 131 of that sensor 130 as needed to form a sensor-main chip set including one or more sensors 130 and the main control chip 120. Then, a user may input information related to the sensor identifier of the physically connected target sensor 130 and the communication port identifier of the physically connected target communication port 122 through a user interface provided by the user terminal 110. The user terminal 110 generates corresponding connection configuration information according to the input of the user and transmits the connection configuration information to the processor 121. The processor 121 executes the sensor configuration method according to any embodiment of the present disclosure, so as to establish a connection on a software level between the target communication port 122 of the currently physically connected main control chip 120 and the communication port 131 of the target sensor 130.

Figure 2:
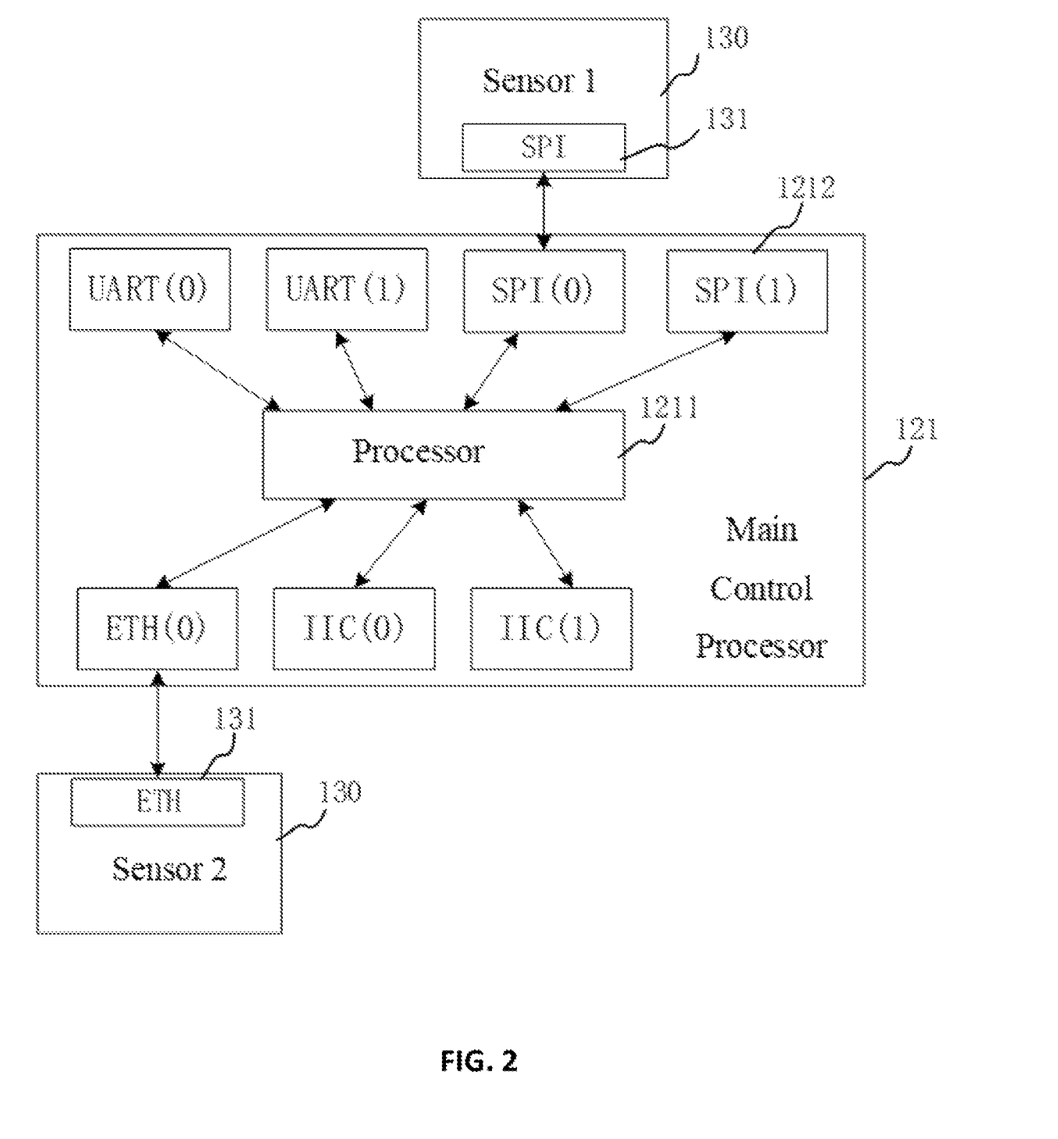
FIG. 2 is a schematic diagram of a main control chip in one embodiment.

FIG. 2 shows a specific example of the main control chip 120 in FIG. 1. In the FIG. 2, the main control chip 120 includes a processor 121 and seven communication ports 122, which are UART (0), UART (1), SPI (0), SPI (1), ETH (0), IIC (0), and IIC (1), respectively connected to the processor 121. It is understood that the type and number of communication ports 122 shown in FIG. 2 are merely examples, and the actual port type and number may vary as desired. In FIG. 2, a communication port SPI (0) of the main control chip 120 is physically connected to an SPI communication port of the sensor 1. A communication port ETH (0) of the main control chip 120 is physically connected to an ETH communication port of the sensor 2.

Since the main control chip 120 has multiple types of communication ports, and there may be multiple communication ports in each of the type. There may also be multiple different types and models of the connected sensors 130, and the connection between the communication port of each main control chip 120 and the communication port of the sensor 130 in the software layer needs to be implemented by using a corresponding driver supporting a corresponding communication protocol. The driver includes two parts, namely, a communication port driver and a sensor driver. The communication ports of different types need to be connected by using the communication ports supporting the different types of protocols, and the sensors of different types and models need to be driven by different sensor drivers.

The application of the sensor-connected main control chip 120 shown in FIG. 2 to the project development phase related to the sensor is illustrated as follows. In the conventional sensor configuration method, assuming that in project I, the SPI port of the sensor 1 needs to be connected to the SPI (0) port of the SOC of the main control chip, the user needs to manually modify the software program of the main control chip so that it calls the driver that supports the communication protocol of the SPI (0) and can drive the sensor 1 to implement the communications between the main control chip and the sensor through the SPI (0) port. In project I1, the SPI port of the sensor 1 needs to be changed to the SPI (2) port connected to the main control chip SOC, and the user needs to manually modify the software program of the main control chip, so that the user calls a driver, which supports the communication protocol of the SPI (2), and can drive the sensor 1 to implement communications with the sensor 1 through the SPI (2) port. Thus, whenever the connection between the sensor and the main control chip needs to be changed, the user is required to change the software program, which results in low efficiency in configuring the connection between the sensor and the main control chip.

Various embodiments described below of the present disclosure propose a sensor configuration method that solves the above-described problems.

Figure 3:
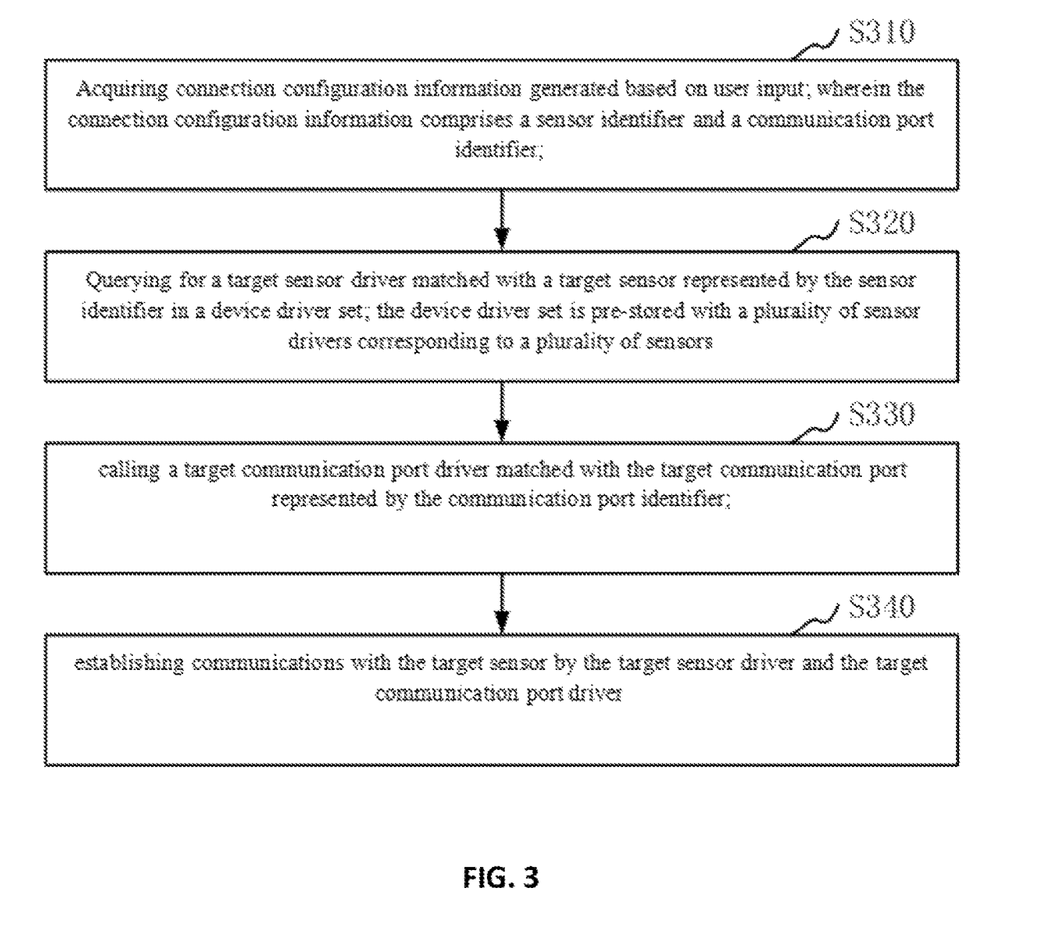
FIG. 3 is a schematic flow chart diagram of a method for configuring a sensor in one embodiment.

In one embodiment, as shown in FIG. 3, a sensor configuration method is provided, which is described by taking the example of the method applied to the processor 121 in FIG. 1, and includes the steps as follows.

Step S310, connection configuration information generated based on user input is acquired. The connection configuration information includes a sensor identifier and a communication port identifier.

Herein, the sensor identifier is information for uniquely identifying the sensor 130. The communication port identification is information for uniquely identifying the communication port 122 of the main control chip 120.

The user may manually physically connect the designated sensor to the communication port of the designated main control chip 120. It can be understood that the communication port of the physically connected sensor and the communication port of the main control chip need to be communication ports supporting the same communication protocol type. For example, in FIG. 2, the communication port SPI (0) of the main control chip and the SPI communication port of the sensor 1 physically connected thereto both support the SPI protocol. The user may then input through the user interface provided by the user terminal 110 to determine the sensor identifier of the target sensor and the communication port identification of the target communication port of the main control chip 120 that have currently established a physical connection and need to establish communications. For example, the sensor identifier may include information of a sensor type and a sensor serial number. The sensor type corresponds to the physical quantity type that the sensor can collect, and the sensor serial number corresponds to different manufacturers, different models and parameters of the same type of sensor. The communication portID may be a communication port serial number, which corresponds to the serial number of the communication port on the main control chip 120.

In this step, the user terminal 110 may, according to a predetermined encoding rule based on the above-mentioned user input, generate connection configuration information including a sensor identifier and a communication port identification and transmit the generated connection configuration information to the processor 121. The sensor identifier may include a type code corresponding to the type of the sensor and a serial number code corresponding to the inputted sensor serial number. For example, the sensor identifier may be represented using a 32-bit number, where the upper 16 bits represent the sensor type, and the lower 16 bits represent the sensor serial number. The communication port identification is determined by the communication port sequence number, i.e. the communication port identification may include the communication port sequence number, or a number determined based on the communication port sequence number encoding.

Step S320, a target sensor driver matched with a target sensor represented by the sensor identifier in a device driver set is queried. The device driver set is pre-stored with a number of sensor drivers corresponding to a number of sensors.

In one embodiment, the sensor identifier includes information of a sensor type and a sensor serial number. The step of querying for the target sensor driver matched with the target sensor represented by the sensor identifier in the device driver set includes analyzing the sensor identifier to obtain the type and the sensor serial number; querying the device driver set to obtain a device driver subset matched with the sensor type from the device driver set; and querying the device driver subset to acquire the target sensor driver matched with the sensor serial number from the device driver subset.

When developing a sensor driver of a certain sensor, a user may select a current port from all communication ports of the main control chip to connect to the sensor, and complete development of the sensor driver under the current port configuration (rate, phase, polarity), where the current port is used as a default port of the sensor.

Step S330, a target communication port driver matched with the target communication port represented by the communication port identifier is called.

The communication ports of the main control chip 120 are fixed, so that the related information of all the communication ports of the main control chip, including the serial numbers of the communication ports and the corresponding communication port drivers, can be pre-stored in the main control chip 120 for calling when the sensor is connected. Wherein, each communication port driver includes a communication protocol corresponding to the communication port type of the communication port matched with the communication port driver.

The main control chip 120 may record the communication port serial number of the communication port of the main control chip to which each sensor is connected by default in the sensor connection list. When developing a sensor drive of a certain sensor, a user selects a communication port to connect the sensor for drive development, after the development is completed, the selected communication port is used as a default communication port of the sensor, and a communication port identification corresponding to the default communication port and a sensor identifier of the sensor are associated and stored in a sensor connection list. When the user calls the query function, the processor 121 may transmit the communication port identifier corresponding to the default communication port to the user terminal in the form of a return value to inform the user. When the user input is received for generating connection configuration information, if the default communication port is consistent with the communication port identification designated by the user, the default communication port is used for communication connection. If the default communication port is inconsistent with the communication port identification designated by the user, the communication port identification designated by the user is updated into the sensor connection list, and the target communication port corresponding to the communication port identification designated by the user is used for communication connection.

Step S340, communications with the target sensor are established through the target communication port by the target sensor driver and the target communication port driver.

In this step, the processor 121 may establish a connection between the main control chip 120 and the target sensor 130 through the target communication port by using the target communication port driver supporting the communication protocol of the target communication port and the target sensor driver.

In the sensor configuration method, a number of sensor drivers corresponding to a number of sensors are pre-stored in an equipment driver set. The communication port drivers supporting communication protocols of different communication port types and matched with different communication port identifiers are pre-stored, so that when a main control chip needs to establish communications with the sensors, a target sensor driver matched with a target sensor represented by the sensor identifier and a target communication port driver matched with a communication port represented by the communication port identifier are acquired and called according to connection configuration information which is generated by user input and contains the sensor identifier and the communication port identifier. The connection between the main control chip and the target sensor is established by utilizing the queried target sensor driver and the queried target communication port driver. Therefore, a user can flexibly change the connection configuration between various sensors and the main control chip according to the requirement. The main control chip can automatically call corresponding driving programs according to the input of the user to realize the communication connection between the target sensor and the main control chip. The user does not need to manually modify the software program of the main control chip, and the efficiency of the connection between the configuration main control chip and the sensors is effectively improved.

In one embodiment, prior to the step of acquiring the connection configuration information generated based on the user input, the method further includes the steps of generating the sensor identifier of each sensor and a sensor drive matched with the sensor respectively for each sensor in the number of sensors and storing the sensor identifier of each sensor in association with corresponding sensor drive into the device drive set That is, before the step S310, the user may develop sensor drivers for various possible sensors to be utilized in advance, and store the sensor drivers of the developed sensors and the sensor identifiers of the sensors in association in the device driver set, so as to call up corresponding sensor drivers as needed in step S320. The device driver set may be implemented by a Hardware Abstraction Layer (HAL) provided in an application system of the main control chip 120.

After the user physically connects one or more sensors 130 to the main control chip 120 to form a sensor-main control chip set, in steps S310-S340 of the method of the present disclosure, the user may specify which sensors in the set to establish communications according to the usage requirement to specify which sensors to be used. The specifying may be implemented by the registration process of the sensors in the following embodiments.

Figure 4:
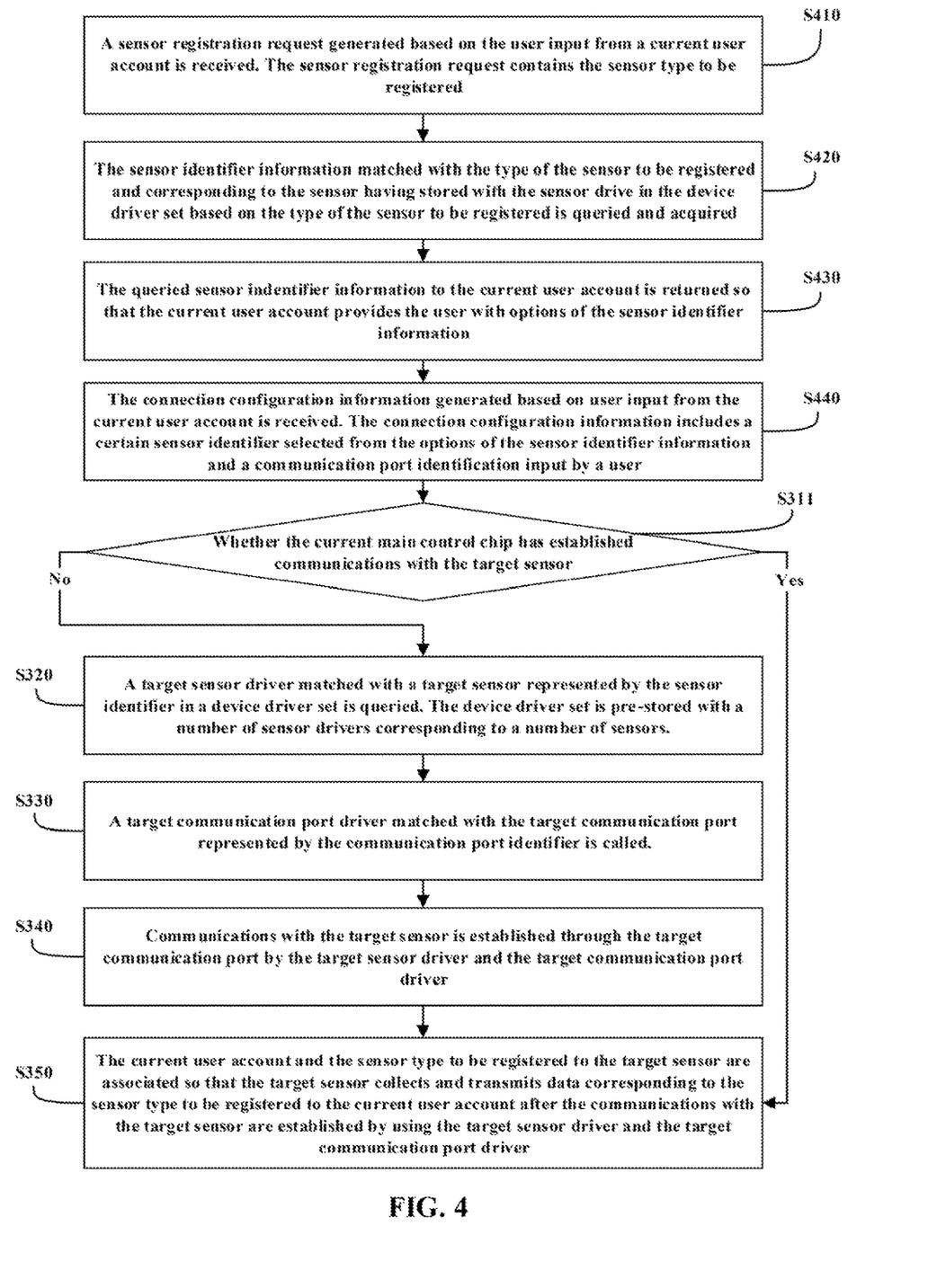
FIG. 4 is a schematic flow chart diagram illustrating the sensor registration step in one embodiment.

In one embodiment, as shown in FIG. 4, the acquiring of the connection configuration information generated based on the user input in step S310 includes the steps as follows.

Step S410, a sensor registration request generated based on the user input from a current user account is received. The sensor registration request contains the sensor type to be registered.

Step S420, the sensor identifier information matched with the type of the sensor to be registered and corresponding to the sensor having stored with the sensor drive in the device driver set based on the type of the sensor to be registered is queried and acquired.

The sensor connection list is configured for storing sensor identifier information corresponding to a sensor (referred to as a supported sensor for short) in which a sensor drive is stored in the device drive set, and can also be used for storing and updating a default communication port identification corresponding to the sensor in which the sensor drive is stored.

Step S430, the queried sensor identifier information to the current user account is returned so that the current user account provides the user with options of the sensor identifier information.

Step S440, the connection configuration information generated based on user input from the current user account is received. The connection configuration information includes a certain sensor identifier selected from the options of the sensor identifier information and a communication port identification input by a user.

Figure 5:
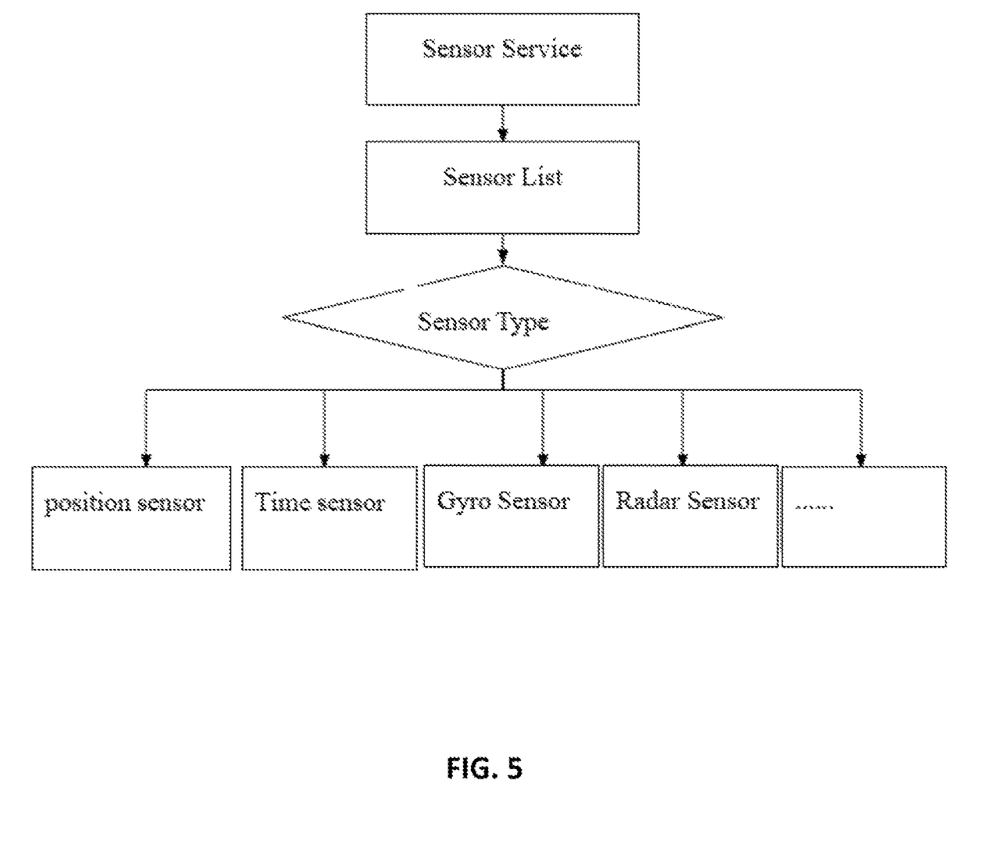
FIG. 5 is a schematic diagram of a sensor query step in one embodiment.

When a user is to establish a communications with a sensor in a set to use a designated sensor, the user may not know which sensor drivers are supported in the current set. In this embodiment, a user may obtain information of supported sensors through a query function. When a certain type of sensor needs to be used, only the required sensor type needs to be transmitted to the main control chip as a parameter, and the main control chip may feedback, to the user, sensor identifier information of all supported sensors matching the required sensor type and stored in the sensor connection list, and the default communication port identifications of the supported sensors and the main control chip. For example, as shown in FIG. 5, a user may transmit a sensor type to be used to a sensor list module through a sensor service interface. The sensor list module searches a sensor connection list for information of all supported sensors matching the sensor type according to a definition of the sensor type, the information of the supported sensors may include sensor identifiers of the supported sensors and default communication port identifications of the supported sensors, and returns the sensor identifiers of the supported sensors and the default communication port identifications to a current user account of the user terminal, so that the current user account provides the user with an option of the supported sensors through a user interface of the user terminal. Then, a user can register information of a target sensor and a specified communication port which need to be used in the sensor as parameters through a user interface, and the corresponding target sensor can normally operate so as to transmit data of the type of the required sensor to a current user account of the user. When the information of the communication port designated by the user is inconsistent with the corresponding stored default communication port identification in the current sensor connection list, the default communication port identification can be updated by using the information of the communication port designated by the user.

Current sensors are highly integrated, and a single sensor may be able to collect data for multiple sensor types. For example, an on-board GNSS chip may collect data for a variety of sensor types, such as time, position, acceleration, attitude angle, and the like. However, in use, a user may only need to use a portion of the sensor type data, which may lead to unnecessary redundancy of information if the sensors transmit all of the collected sensor type data to the same user account.

To address this issue, as shown in FIG. 4, in one embodiment, the connection configuration information in step S310 further includes a sensor type. After the step of acquiring the connection configuration information generated based on user input, the method further includes the following steps.

S311: whether the current main control chip has established a communications with the target sensor is determined.

If it is determined in S311 that communications with the target sensor is not established, the method is jump to the step S320 for performing. After establishing the communications with the target sensor by the target sensor driver and the target communication port driver in the step S340, the following step S350 is also executed.

S350, the current user account and the sensor type to be registered to the target sensor are associated so that the target sensor collects and transmits data corresponding to the sensor type to be registered to the current user account after the communications with the target sensor are established by using the target sensor driver and the target communication port driver.

Further, in an embodiment, after acquiring the connection configuration information generated based on the user input in step S310, the sensor configuration method further includes:

when it is determined in S311 that the communications have been established with the target sensor, the above-described step S350 is directly performed after the connection configuration information generated based on the user input is acquired in step S310.

In this embodiment, when a target sensor can collect data of multiple sensor types, different user accounts of different users are distinguished, multiple sensor types corresponding to a single target sensor are independently registered. During the registration, as long as at least one sensor type corresponding to the target sensor needs to be registered to the sensor, a communication is established with the sensor. Only for the first sensor type needing to be registered, a communication is established with the sensor corresponding to the sensor type, and subsequent sensor types directly return information of successful registration without repeatedly establishing a communication connection with the corresponding sensor, so that repeated registration of the single sensor (i.e., repeated establishment of a communication) is avoided. The data of the required sensor type is returned to the corresponding current user account, so as to avoid information redundancy.

By way of example, the above embodiments may be implemented by the following scheme. A number of independent sub-sensor modules aiming at a number of sensor types corresponding to each sensor are respectively packaged. A registration function of the sub-sensor module corresponding to the sensor type specified and registered by the user is called when each user registers the sensor. Only the communication between the main control chip and the sensor aiming at the first called registration function is established when one or more registration functions of one or more sub-sensor modules in the number of sub-sensor modules corresponding to each sensor are called.

For example, in the field of smart driving, in order to achieve higher integration, GNSS sensors and IMU sensors are often integrated in one module, which is called a combined navigation sensor. Firstly, a first layer of combined navigation sensors is abstracted, namely the IMU equipment and GNSS equipment, then the combined navigation sensors are abstracted again. A time module (for measuring time information) and a position module (for measuring position information) for the GNSS equipment are abstracted to form modules of two sensor types. A gyroscope module (used for detecting gyroscope information) and an acceleration module (used for measuring acceleration information) are abstracted from the IMU equipment, and the two sensor types are the modules. After the abstraction is completed twice, the user is faced with a simple physical quantity, the user only needs to use the measurement data of which sensor type to complete the registration of the module corresponding to the sensor type, the problem of coupling inside the combined navigation sensor is not concerned, and the influence on data acquisition of other sensor types is not considered.

Figure 6:
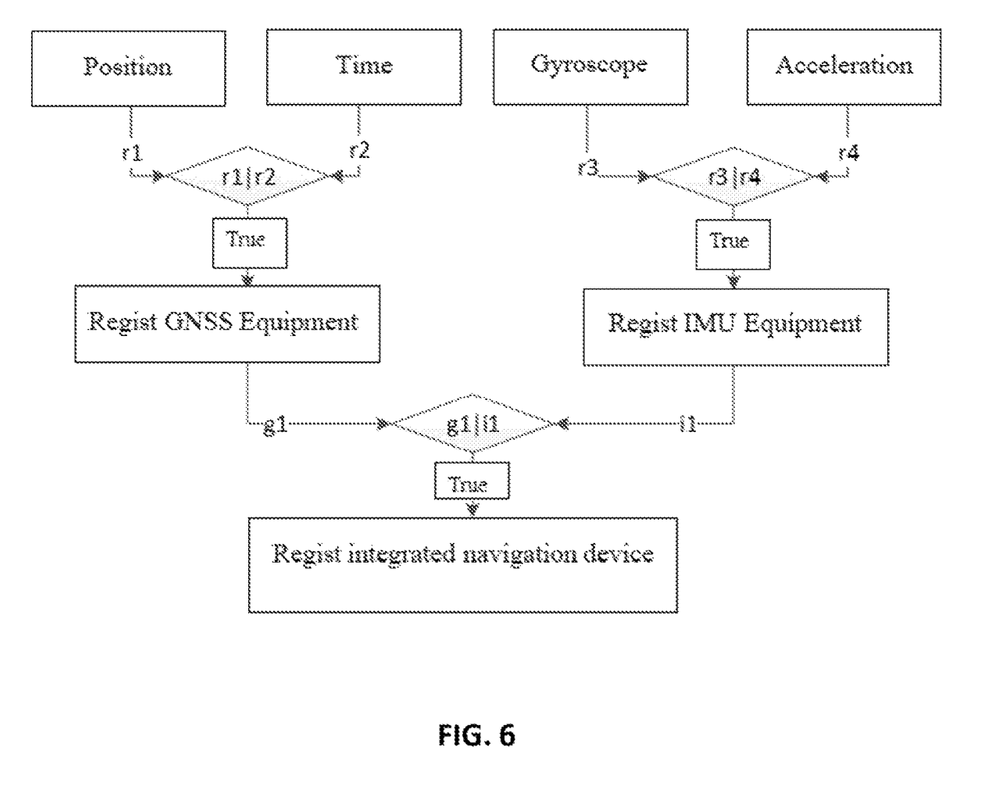
FIG. 6 is a schematic diagram of a sensor registration step in one embodiment.

As shown in FIG. 6, it is assumed that A, B, C, D four users need to acquire information of four sensor types of time, position, gyroscope, and acceleration. Four current user accounts corresponding to the four users (The A, B, C and D) need to call the registration functions r1, r2, r3, r4 of the four sensor type modules, respectively. The registration function g1 of the GNSS device needs to be called by r1 and r2, and assuming that the r1 is called first and the r2 is called later. After the completion of the calling of r1, the GNSS device is successfully registered, and the GNSS device calls the registration function g1 to register the integrated navigation sensor r2, when it is recalled, the GNSS device detects that it has already registered, and directly returns a registration success flag. This avoids the problem of the sensor device being repeatedly registered. Similarly, as long as the combined navigation sensor receives any one of the registration function g1 of the GNSS device or the registration function i1 of the IMU device, the combined navigation sensor is successfully registered when receiving the registration function for the first time, and establishes a communication with the combined navigation sensor, and does not need to be repeatedly registered when receiving the registration function subsequently.

After the user physically connects one or more sensors 130 to the main control chip 120 to form the sensor-main control chip set, the user may specify which sensors in the set are to be communicatively connected to according to usage requirements to specify which sensors are to be used. Or the user may also specify which sensors in the set are to be communicatively disconnected according to usage requirements to specify which sensors are no longer to be used, which may be implemented by a log-off procedure for the sensors in the following embodiments.

Figure 7:
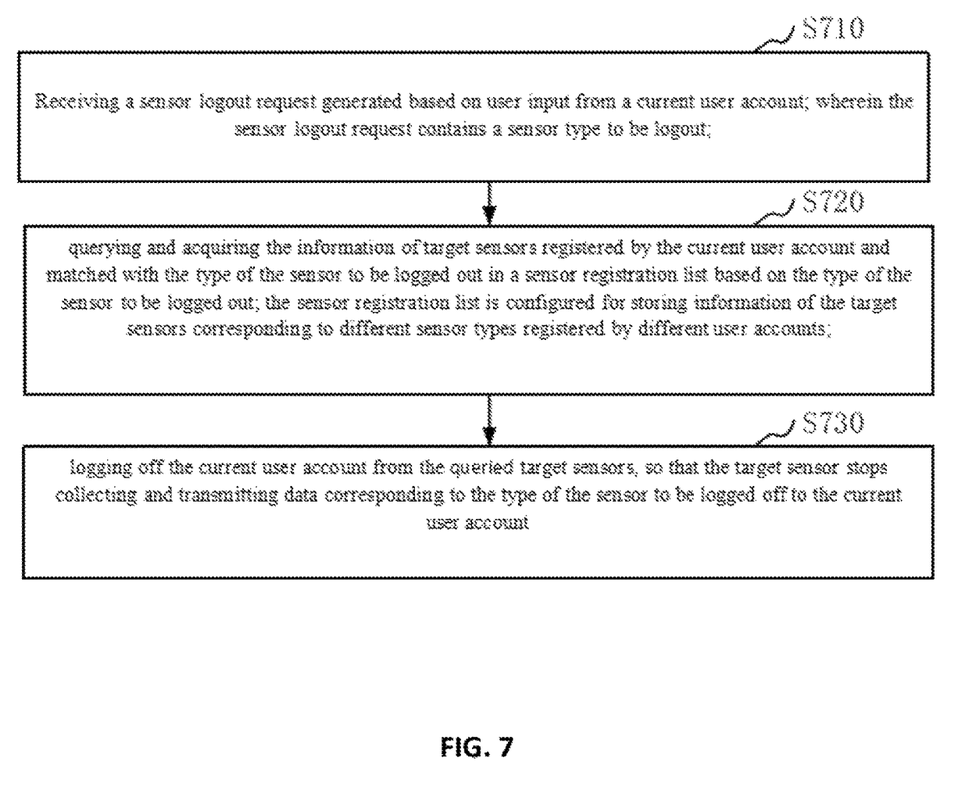
FIG. 7 is a schematic flow chart diagram illustrating a sensor logging off step in one embodiment.

In one embodiment, as shown in FIG. 7, the sensor configuration method further includes as follows.

Step S710, a sensor logout request generated based on user input from a current user account is received. The sensor logout request contains a sensor type to be logged out;

Step S720, based on the type of the sensor to be logged out, the information of a target sensor which is registered in the current user account and is matched with the type of the sensor to be logged out in a sensor registration list is queried and acquired.

The sensor registration list is used for storing information of target sensors corresponding to different sensor types registered by different user accounts.

Step S730, the current user account from the inquired target sensor is logged off, so that the target sensor stops collecting and transmitting data corresponding to the type of the sensor to be logged off to the current user account.

In this implementation, the sensor registration list pre-stores information of target sensors corresponding to different sensor types registered by different user accounts. When a user no longer needs to use data of a certain sensor type, a current user account corresponding to the user can transmit the sensor type as a parameter to the main control chip. The main control chip can find the corresponding sensor by querying the sensor registration list, and log out the current user account from the previously registered sensor, so that the target sensor stops acquiring and transmitting data corresponding to the sensor type to the current user account.

For the case where a single sensor may collect data for multiple sensor types, at the time of logging off, the user may only need to logout data for a portion of the sensor types, and thus needs to consider logging out separately for each sensor type.

In one embodiment, the step of logging off the current user account from the queried target sensors, so that the target sensor stops collecting and transmitting data corresponding to the type of the sensor to be logged off to the current user account includes the steps of disassociating the current user account and the sensor type to be logged out from the target sensor when other user accounts or other sensor types are associated to the target sensor, so that the target sensor stops collecting and transmitting data corresponding to the sensor type to be logged out to the current user account; and canceling the communications established with the target sensor, and disassociating the current user account and the sensor type to be logged out from the target sensor when no other user account exists or other sensor types are associated to the target sensor, so that the target sensor stops collecting and transmitting data corresponding to the sensor type to be logged out to the current user account.

In this embodiment, when a target sensor can collect data of multiple sensor types, different user accounts of different users are distinguished, multiple sensor types corresponding to a single target sensor are independently logged out. When logging out, communications with the sensor are disconnected only when all sensor types corresponding to the target sensor need to be logged out from the sensor, that is, only for the last sensor type, the communication with the sensor is disconnected, so that the sensor can be in a communication state when at least one sensor type is registered.

By way of example, the above embodiments may be implemented by the following scheme. A number of independent sub-sensor modules aiming at a number of sensor types corresponding to each sensor are correspondingly packaged. Only a logout function of a registered sub-sensor module corresponding to a sensor type which is specified to be logged out is called by a user when each user logs out the sensor, and only the communication between the main control chip and the sensor aiming at the last called logout function is disconnected when one or more logout functions of one or more registered sub-sensor modules are called in the number of registered sub-sensor modules of the number of registered sensor types corresponding to each sensor.

Figure 8:
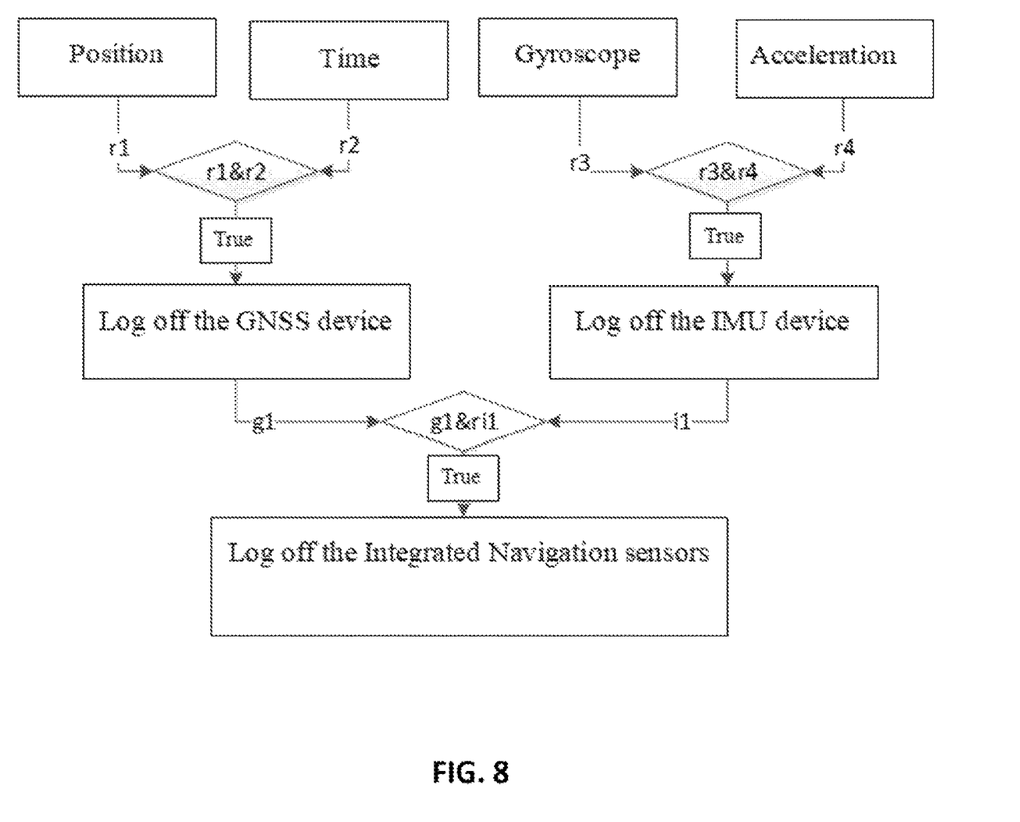
FIG. 8 is a schematic diagram of a sensor logging off step in one embodiment.

Taking also the GNSS device as an example, as shown in FIG. 8, in a case where the registration functions r1, r2, r3, and r4 of the four sensor type modules have been respectively called by the four current user accounts corresponding to the A, B, C, D four users to complete registration of data of the four sensor types of time, position, gyroscope, and acceleration, it is assumed that the A, B, C, D four users need to log off the use of data of the four sensor types of time, position, gyroscope, and acceleration, respectively. The four current user accounts corresponding to the four users (A, B, C and D) need to call the logout functions d1, d2, d3 and d4 of the modules of the four sensor types, respectively. If the d1 or d2 needs to call the log off function g2 of the GNSS device, the GNSS device will be successfully logged off only when the GNSS device detects that both d1 and d2 call the log off function of the GNSS device. The GNSS device will call the log off function g2 of the GNSS device to log off the combined navigation sensor. If only one of the log off functions is called, for example, only d1 calls the logging-out function, the GNSS device detects that r2 is still in a logged-in state, and the GNSS device will not logged out, that is, the communication connection with the GNSS device is not disconnected. However, the information that the logging-out is successful is directly returned to the current user account logged out of d1. Similarly, the integrated navigation sensor is only logged successfully, i.e. the integrated navigation sensor is disconnected from communication, when it receives both the log off function g2 of the GNSS device and the log off function i2 of the IMU device.

It should be understood that although the steps in the flowcharts of FIGS. 3, 4 and 7 are shown in order as indicated by the arrows, the steps are not necessarily performed in order as indicated by the arrows. The steps are not limited to being performed in the exact order illustrated and, unless explicitly stated herein, may be performed in other orders. Moreover, at least some of the steps in FIGS. 3, 4, and 7 may include multiple sub-steps or multiple stages that are not necessarily performed at the same time, but may be performed at different times, and the order of performing the sub-steps or stages is not necessarily sequential, but may be performed alternately or alternatingly with other steps or at least some of the sub-steps or stages of other steps.

Figure 9:
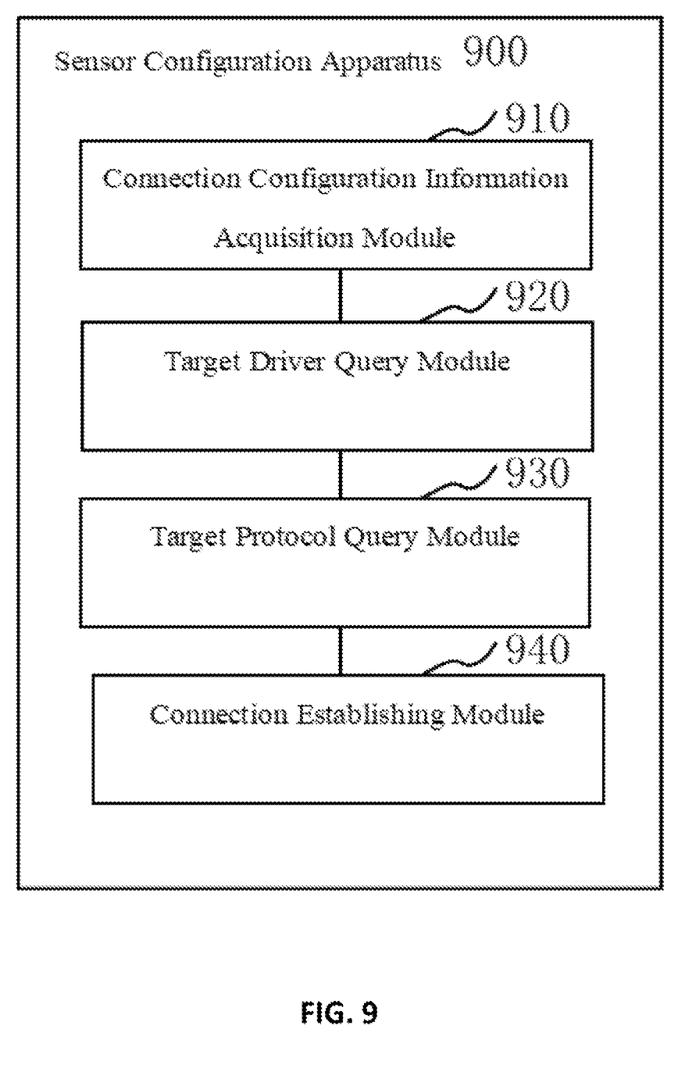
FIG. 9 is a block diagram showing the structure of a sensor configuration according to an embodiment.

In one embodiment, as shown in FIG. 9, there is provided a sensor configuration apparatus 900 which includes a connection configuration information acquisition module 910, a target driver query module 920, a target protocol query module 930, and a connection establishing module 940.

The connection configuration information acquisition module 910 is configured to acquire connection configuration information generated based on user input; wherein the connection configuration information comprises a sensor identifier and a communication port identifier.

The target driver query module 920 is configured to, query for a target sensor driver matched with a target sensor represented by the sensor identifier in a device driver set. The device driver set is pre-stored with a number of sensor drivers corresponding to a number of sensors.

The target protocol query module 930 is configured to call a target communication port driver matched with the target communication port represented by the communication port identifier.

The connection establishing module is configured to establish communications with the target sensor by the target sensor driver and the target communication port driver.

For specific definitions of the sensor configuration apparatus 900, reference may be made to the above definitions of the sensor configuration method, and the details are not repeated here. The various modules in the sensor configuration apparatus 900 described above may be implemented in whole or in part by software, hardware, and combinations thereof. The modules can be embedded in a hardware form or independent of a processor in the computer device, and can also be stored in a memory in the computer device in a software form, so that the processor can call and perform operations corresponding to the modules.

Figure 10:
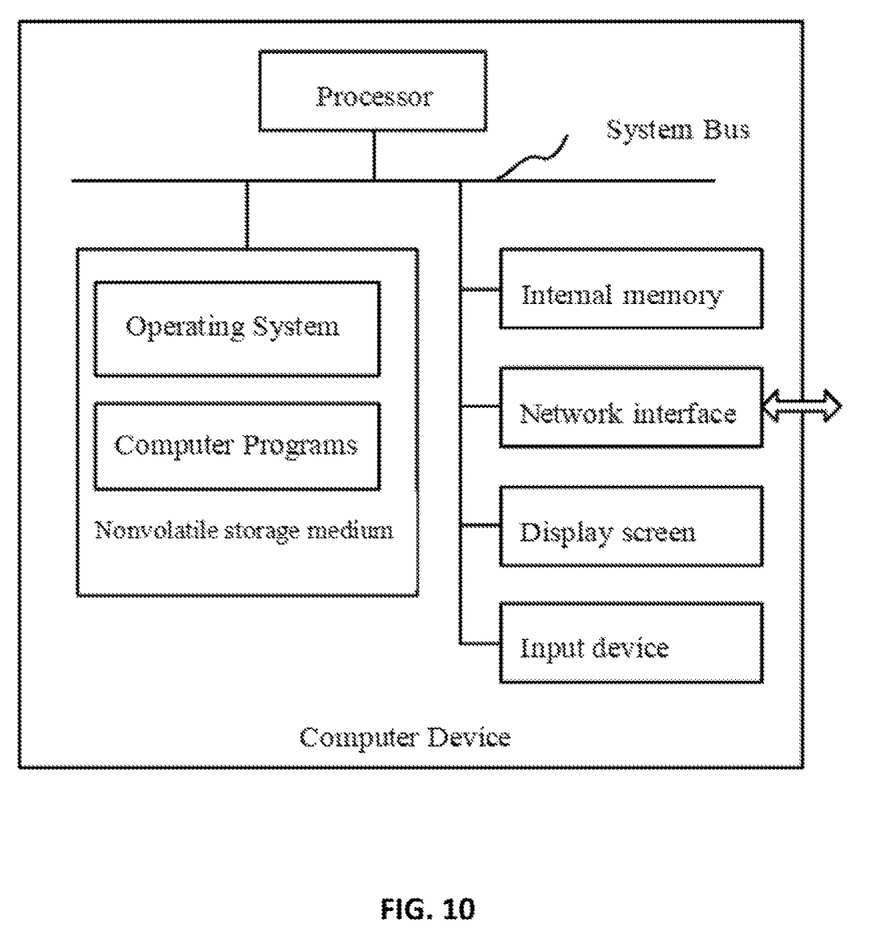
FIG. 10 is an internal structural diagram of a computer device in one embodiment.

In one embodiment, a computer device is provided, and the internal structure of the computer device may be as shown in FIG. 10. The computer device includes a processor, a memory, a network interface, a display screen and an input device which are connected through a system bus. The processor of the computer device is configured to provide computing and control capabilities. The memory of the computer device includes a nonvolatile storage medium and an internal memory. The non-volatile storage medium stores an operating system and a computer program. The internal memory provides an environment for the operating system and the computer program to run on the non-volatile storage medium. The network interface of the computer device is configured for communicating with an external terminal through a network connection. The computer program is executed by a processor to implement a sensor configuration method. The display screen of the computer equipment can be a liquid crystal display screen or an electronic ink display screen, and the input device of the computer equipment can be a touch layer covered on the display screen, a key, a track ball or a touch pad arranged on a shell of the computer equipment, an external keyboard, a touch pad or a mouse and the like.

It will be appreciated by those skilled in the art that the configuration shown in FIG. 10 is a block diagram of only a portion of the configuration associated with the present disclosure, and is not intended to limit the computing device to which the present disclosure may be applied, and that a particular computing device may include more or less components than those shown, or may combine certain components, or have a different arrangement of components.

In one embodiment, a computer device is provided, which includes a memory having a computer program stored therein and a processor that when executing the computer program implements the steps of acquiring connection configuration information generated based on user input, querying for a target sensor driver matched with a target sensor represented by the sensor identifier in a device driver set; the device driver set is pre-stored with a number of sensor drivers corresponding to a number of sensors, calling a target communication port driver matched with the target communication port represented by the communication port identifier and establishing communications with the target sensor by the target sensor driver and the target communication port driver. The connection configuration information includes a sensor identifier and a communication port identifier.

In other embodiments, the processor, when executing the computer program, further implements the steps of the sensor configuration method of any of the above embodiments.

In one embodiment, a computer-readable storage medium is provided, on which a computer program is stored which, when executed by a processor, performs the steps of acquiring connection configuration information generated based on user input, querying for a target sensor driver matched with a target sensor represented by the sensor identifier in a device driver set; the device driver set is pre-stored with a number of sensor drivers corresponding to a number of sensors, calling a target communication port driver matched with the target communication port represented by the communication port identifier and establishing communications with the target sensor by the target sensor driver and the target communication port driver. The connection configuration information includes a sensor identifier and a communication port identifier.

In other embodiments, the computer program, when executed by the processor, further implements the steps of the sensor configuration method of any of the above embodiments.

It will be understood by those skilled in the art that all or part of the processes of the methods of the embodiments described above may be implemented by hardware that is instructed by a computer program, and the computer program may be stored in a non-volatile computer-readable storage medium, and when executed, may include the processes of the embodiments of the methods described above. Any reference to memory, storage, database or other medium used in the embodiments provided herein can include non-volatile and/or volatile memory. Non-volatile memory can include read-only memory (ROM), Programmable ROM (PROM), Electrically Programmable ROM (EPROM), Electrically Erasable Programmable ROM (EEPROM), or flash memory. Volatile memory can include Random Access Memory (RAM) or external cache memory. By way of illustration and not limitation, RAM is available in a variety of forms such as Static RAM (SRAM), Dynamic RAM (DRAM), Synchronous DRAM (SDRAM), Double Data Rate SDRAM (DDRSDRAM), Enhanced SDRAM (ESDRAM), synchronous Link (Synchlink) DRAM (SLDRAM), Rambus (Rambus) direct RAM (RDRAM), direct bused dynamic RAM (DRDRAM), and bused dynamic RAM (RDRAM).

All possible combinations of the technical features in the above embodiments may not be described for the sake of brevity, but should be considered as being within the scope of the present disclosure as long as there is no contradiction between the combinations of the technical features.

The above examples only express several embodiments of the present disclosure, and the description thereof is more specific and detailed, but not to be construed as limiting the scope of the invention. It should be noted that, for a person skilled in the art, several variations and modifications can be made without departing from the concept of the present disclosure, and these are all within the scope of protection of the present disclosure. Therefore, the protection scope of the present patent application shall be subject to the appended claims.

What is claimed is:

1. A method for configuring sensors, comprising:
   acquiring connection configuration information generated based on user input; wherein the connection configuration information comprises a sensor identifier and a communication port identifier;
   querying for a target sensor driver matched with a target sensor represented by the sensor identifier in a device driver set; the device driver set is pre-stored with a plurality of sensor drivers corresponding to a plurality of sensors;
   calling a target communication port driver matched with the target communication port represented by the communication port identifier; and
   establishing communications with the target sensor by the target sensor driver and the target communication port driver.

2. The method of claim 1, wherein prior to the step of acquiring the connection configuration information generated based on the user input, the method further comprises:
   generating the sensor identifier of each sensor and a sensor drive matched with the sensor respectively for each sensor in the plurality of sensors; and
   storing the sensor identifier of each sensor in association with corresponding sensor drive into the device drive set.

3. The method of claim 1, wherein the sensor identifier comprises information of a sensor type and a sensor serial number; the step of querying for the target sensor driver matched with the target sensor represented by the sensor identifier in the device driver set comprises:
   analyzing the sensor identifier to obtain the type and the sensor serial number;
   querying the device driver set to obtain a device driver subset matched with the sensor type from the device driver set; and
   querying the device driver subset to acquire the target sensor driver matched with the sensor serial number from the device driver subset.

4. The method of claim 1, wherein the step of acquiring the connection configuration information generated based on user input comprises:
   receiving a sensor registration request generated based on the user input from a current user account; wherein the sensor registration request contains the sensor type to be registered;
   querying and acquiring the sensor identifier information matched with the type of the sensor to be registered and corresponding to the sensor having stored with the sensor drive in the device driver set based on the type of the sensor to be registered;
   returning the queried sensor identifier information to the current user account so that the current user account provides the user with options of the sensor identifier information; and
   receiving the connection configuration information generated based on user input from the current user account; wherein the connection configuration information comprises a certain sensor identifier selected from the options of the sensor identifier information and a communication port identification input by a user.

5. The method of claim 1, wherein the connection configuration information further comprises a sensor type;
   after the step of acquiring the connection configuration information generated based on user input, the method further includes:
   jumping to and executing the step of querying for the target sensor driver matched with the target sensor represented by the sensor identifier in the device driver set when no communications with the target sensor are established; and
   associating the current user account and the sensor type to be registered to the target sensor so that the target sensor collects and transmits data corresponding to the sensor type to be registered to the current user account after the communications with the target sensor are established by using the target sensor driver and the target communication port driver.

6. The method of claim 5, wherein after obtaining the connection configuration information generated based on the user input, the method further comprises:
directly associating the current user account and the sensor type to be registered to the target sensor after the connection configuration information generated based on user input is acquired when communications have been established with the target sensor so that the target sensor collects and transmits data corresponding to the sensor type to be registered to the current user account.

7. The method of claim 1, further comprising:
receiving a sensor logout request generated based on user input from a current user account; wherein the sensor logout request contains a sensor type to be logout;
querying and acquiring the information of target sensors registered by the current user account and matched with the type of the sensor to be logged out in a sensor registration list based on the type of the sensor to be logged out; the sensor registration list is configured for storing information of the target sensors corresponding to different sensor types registered by different user accounts;
logging off the current user account from the queried target sensors, so that the target sensor stops collecting and transmitting data corresponding to the type of the sensor to be logged off to the current user account.

8. The method of claim 7, wherein the step of logging off the current user account from the queried target sensors, so that the target sensor stops collecting and transmitting data corresponding to the type of the sensor to be logged off to the current user account comprises:
disassociating the current user account and the sensor type to be logged out from the target sensor when other user accounts or other sensor types are associated to the target sensor, so that the target sensor stops collecting and transmitting data corresponding to the sensor type to be logged out to the current user account; and
canceling the communications established with the target sensor, and disassociating the current user account and the sensor type to be logged out from the target sensor when no other user account exists or other sensor types are associated to the target sensor, so that the target sensor stops collecting and transmitting data corresponding to the sensor type to be logged out to the current user account.

9. A sensor configuration apparatus, comprising:
a connection configuration information acquisition module configured to, acquire connection configuration information generated based on user input; wherein the connection configuration information comprises a sensor identifier and a communication port identifier;
a target driver query module configured to, query for a target sensor driver matched with a target sensor represented by the sensor identifier in a device driver set; the device driver set is pre-stored with a plurality of sensor drivers corresponding to a plurality of sensors;
a target protocol query module configured to call a target communication port driver matched with the target communication port represented by the communication port identifier; and
a connection establishing module configured to establish communications with the target sensor by the target sensor driver and the target communication port driver.

10. A computer device comprising a memory storing a computer program and a processor; wherein the processor implements the steps of the method of claim 1 when executing the computer program.

11. A computer-readable storage medium, on which a computer program is stored which, when being executed by a processor, implements the steps of the method of claim 1.

* * * * *